United States Patent
Maenou et al.

(10) Patent No.: US 7,442,789 B2
(45) Date of Patent: Oct. 28, 2008

(54) METHOD AND APPARATUS FOR ALKALINE SAPONIFICATION OF POLYMER FILM

(75) Inventors: Kazuhiro Maenou, Odawara (JP); Yukihiro Maeda, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 9 days.

(21) Appl. No.: 11/636,480

(22) Filed: Dec. 11, 2006

(65) Prior Publication Data

US 2007/0148370 A1 Jun. 28, 2007

(30) Foreign Application Priority Data

Dec. 9, 2005 (JP) ............................. 2005-356480

(51) Int. Cl.
*C08B 3/22* (2006.01)
(52) U.S. Cl. ......................................... 536/76; 536/127
(58) Field of Classification Search ................... 536/76, 536/124, 58, 68, 69, 127; 428/1.1, 1.3
See application file for complete search history.

(56) References Cited

U.S. PATENT DOCUMENTS

2003/0194668 A1 10/2003 Kawanishi et al.
2004/0036828 A1 * 2/2004 Aminaka et al. ............ 349/117

FOREIGN PATENT DOCUMENTS

JP 8-94838 A 4/1996
JP 2003-313326 A 11/2003

* cited by examiner

*Primary Examiner*—Bernard Dentz
*Assistant Examiner*—David E Gallis
(74) *Attorney, Agent, or Firm*—Sughrue Mion, PLLC

(57) ABSTRACT

The present invention provides a method for alkaline saponification of a polymer film, comprising the steps of: alkaline saponification of the polymer film with an alkaline solution; and washing away the alkaline solution from the alkali-saponified polymer film, wherein the washing step includes a plurality of water-washing steps of washing the alkaline solution coated on the polymer film away using washing water, along the travel direction of the polymer film, and the used washing water is reused in order to perform alkaline saponification of a polymer film which allow efficient use of washing water and realize low cost and low environmental load while maintaining quality stability.

15 Claims, 5 Drawing Sheets

METHOD AND APPARATUS FOR ALKALINE SAPONIFICATION OF POLYMER FILM

BACKGROUND OF THE INVENTION

1. Field of the Invention

The present invention relates to a method and an apparatus for alkaline saponification of a polymer film, in particular, to a method and apparatus for alkaline saponification of a cellulose ester film, which is used as a transparent support for a continuous optical compensation sheet, in which wastewater used for a water-washing step after alkaline saponification was reused, whereby environmental load as well as costs are decreased.

2. Description of the Related Art

In recent years, there have been increasing demands for optical films. Such optical films include optical compensation sheets, which are used in liquid crystal cells as a retardation plate.

When producing an optical compensation sheet by forming an orientation film and an optically anisotropic layer, in which liquid crystal molecules are fixed, on a transparent support, good adhesion is required between the transparent support (usually, a cellulose ester film represented by a cellulose acetate film) and the orientation film (usually, a polyvinyl alcohol). Since the affinity between a cellulose ester film and a polyvinyl alcohol is weak, stripping or cracking often occurs at the interface thereof; thus, a gelatin undercoating layer has been provided on the cellulose ester film. However, to develop adhesion between the undercoating layer and the cellulose ester film, a solvent that penetrates into the cellulose ester film (e.g. a ketone solvent) must be used as a solvent for the coating fluid for providing a gelatin undercoating layer. The use of such a solvent causes the swelling of a cellulose ester film, which gives rise to a problem of causing fine bending of the film in the course of shrinkage in a subsequent drying step. It was found that if an orientation film and a liquid crystal molecule layer are provided on such a bent film, thickness non-uniformity of the orientation film and liquid crystal molecule layer or orientation non-uniformity of the liquid crystal molecules occurs along the bent shape, resulting in inferior image quality of liquid crystal displays.

On the other hand, as a commonly used method for improving the adhesion between a cellulose ester film and a hydrophilic material (e.g. orientation film) without providing a gelatin undercoating layer, a method is known in which a cellulose ester film is immersed in an alkaline aqueous solution, that is, a so-called saponification bath treatment is conducted. The details of such a saponifying method are described in Japanese Patent Application Laid-Open No. 8-94838. In this saponification bath treatment, in which a cellulose ester film is immersed in an alkaline aqueous solution, both sides of the cellulose ester film undergo hydrophilization simultaneously; thus, a problem occurs, when the cellulose ester film having a hydrophilic layer of polyvinyl alcohol etc. provided on its one side is wound up into a roll, of allowing the two sides of the film to adhere to each other. There is a method, as one example of methods for hydrophilizing one side of the cellulose ester film alone in the saponification bath treatment, in which the cellulose ester film is subjected to saponification treatment with its one side, on which saponification treatment is not intended, made waterproof with a laminate or the like. However, such methods not only increase the number of troublesome steps, but also produce unnecessary wastes, and thus, not being preferable from the viewpoint of productivity and environmental conservation.

In these circumstances, a saponification method was proposed in which a solution of alkali in water or in mixed solvent a organic solvent and water is continuously coated on one side of the polymer film alone on which an orientation film is to be provided, and after the reaction time has elapsed, the alkaline solution is washed away from the polymer film (e.g. Japanese Patent Application Laid-Open No. 2003-313326). According to Japanese Patent Application Laid-Open No. 2003-313326, the alkaline solution is washed away from the polymer film by the method in which washing water is sprayed directly on the polymer film using a spray nozzle or the like through a plurality of water-washing steps.

However, in recent years, because of the increase in production of polymer films and the speed-up of the production process as an evitable consequence of the increase in production, the amount of the washing water used in the water-washing steps have been considerably increased, which presents the problem of raising the production cost.

Further, alkaline saponification involves discharge of a large amount of wastewater containing acid or alkali, which also presents the problem of increasing the load on the wastewater treatment as well as the environmental load.

The present invention has been made in the light of these problems. Accordingly, an object of the present invention is to provide a method and apparatus for alkaline saponification of a polymer film which allow efficient use of washing water and realize low cost and low environmental load while maintaining quality stability.

SUMMARY OF THE INVENTION

To achieve the above object, a first aspect of the present invention provides a method for alkaline saponification of a polymer film, including: a step of alkaline saponification of the polymer film with an alkaline solution; and a washing step of washing away the alkaline solution from the alkali-saponified polymer film, wherein the washing step comprises a plurality of water-washing steps, of washing the alkaline solution coated on the polymer film away using washing water, along the travel direction of the polymer film, wherein the used washing water is reused.

According to the first aspect of the present invention, the washing water used in the washing step of washing away the alkaline solution from the alkali-saponified polymer film is reused, whereby washing water can be efficiently used and low costs and low environmental load can be realized while maintaining the quality stability of the polymer film.

A second aspect of the present invention is the method for alkaline saponification of a polymer film according to the first aspect of the present invention, wherein in the plurality of water-washing steps, the washing water used in a downstream water-washing step is recovered and the recovered washing water is reused in a water-washing step upstream of the downstream water-washing step.

The present inventor made use of the fact that the contaminant concentration (alkali concentration etc.) on the surface of a traveling web (polymer film) is decreased toward the travel direction of the traveling web, and he has found a method in which washing water used in a downstream water-washing step is reused, in the opposite direction to the travel direction of the web, in a water-washing step upstream of the downstream water-washing step.

Specifically, according to the second aspect of the present invention, washing water is fed from a downstream water-washing step and the used washing water is reused in a water-washing step upstream of the downstream water-washing step, whereby the downstream washing water having a low contaminant concentration can be reused in the upstream water-washing step where the web has a high contaminant concentration. Thus, washing water can be efficiently used and low costs and low environmental load can be realized while maintaining the quality stability of the polymer film.

A third aspect of the present invention is the method for alkaline saponification of a polymer film according to the second aspect of the present invention, wherein the washing water used in a downstream water-washing step is used, as washing water, in the water-washing step just upstream of the downstream water-washing stepwise from the most downstream water-washing step to the most upstream step.

According to the third aspect of the present invention, washing water is fed from a downstream water-washing step and reused in a water-washing step just upstream of the downstream water-washing step stepwise from the most downstream water-washing step to the most upstream step, whereby the amount of the water used can be reduced without decreasing the washing power of the washing water in each water-washing section. Thus, washing water can be efficiently used and low costs and low environmental load can be realized while maintaining the quality stability of the polymer film.

A fourth aspect of the present invention is the method for alkaline saponification of a polymer film according to any one of the first to third aspects of the present invention, wherein the washing step includes a plurality of sets of water-washing/draining steps comprising the water-washing step described above and a draining step, after the water-washing step, of removing the washing water present on the surface of the polymer film.

According to a fourth aspect of the present invention, a draining step is provided in which the washing water present on the polymer film having been sprayed with washing water is removed, whereby washing water can be efficiently used and low costs and low environmental load can be realized while maintaining the quality stability of the polymer film.

A fifth aspect of the present invention is the method for alkaline saponification of a polymer film according to any one of the first to fourth aspects of the present invention, wherein, of the plurality of water-washing steps, at least the most upstream water-washing step is kept at room temperature or higher.

According to the fifth aspect of the present invention, at least the temperature of the washing water of the most upstream water-washing step, in which the contaminant concentration (alkali concentration etc.) of the polymer film is highest, is kept at room temperature or higher, whereby the contaminants are easy to diffuse in the washing water and the washing power of the washing water can be enhanced. Thus, washing water can be efficiently used and low costs and low environmental load can be realized while maintaining the quality stability of the polymer film. In the method according to the fifth aspect of the present invention, the temperature of the washing water is preferably 37° C.

A sixth aspect of the present invention is the method for alkaline saponification of a polymer film according to any one of the first to fifth aspects of the present invention, further comprising a drying step after the washing step.

According to the sixth aspect of the present invention, the polymer film is heat dried after the washing step, whereby the contaminants or washing water remaining on the polymer film can be removed reliably.

To achieve the above object, a seventh aspect of the present invention provides an apparatus for alkaline saponification of a polymer film, including: an alkaline saponification section in which the polymer film is subjected to with an alkaline solution; and a washing section in which the alkaline solution is washed away from the alkali-saponified polymer film in the alkaline saponification section, wherein the washing section includes a plurality of sets of water-washing/draining units which are provided along the travel direction of the polymer film, each comprising a water-washing device which washes away the alkaline solution coated on the polymer film with washing water and a draining device which is provided subsequently after the water-washing device and removes the washing water present on the surface of the polymer film; and washing water recovering/feeding devices which are provided for the respective water-washing/draining units and each of which recovers the washing water used in a downstream water-washing/draining unit and feeds the recovered washing water to a water-washing/draining unit upstream of the downstream water-washing/draining unit.

The seventh aspect of the present invention is an apparatus in which the method for alkaline saponification of a polymer film of the present invention is implemented, whereby washing water can be efficiently used and low costs and low environmental load can be realized while maintaining the quality stability of the polymer film.

An eighth aspect of the present invention is the apparatus for alkaline saponification of a polymer film according to the seventh aspect of the present invention, wherein in the plurality of water-washing/draining units, at least the most upstream water-washing device is provided with a temperature controlling device.

The eighth aspect of the present invention is apparatus in which the method for alkaline saponification of a polymer film according to the fifth aspect of the present invention is implemented, whereby washing water can be efficiently used and low costs and low environmental load can be realized while maintaining the quality stability of the polymer film.

A ninth aspect of the present invention is a polymer film produced using the method for alkaline saponification of a polymer film according to any one of the first to sixth aspects of the present invention.

A tenth aspect of the present invention is an optical compensation film produced using the method for alkaline saponification of a polymer film according to any one of the first to sixth aspects of the present invention.

According to the ninth and tenth aspects of the present invention, if the present invention is applied to the method for producing an optical compensation sheet or a polymer film as a constituent of liquid crystal displays, washing water can be efficiently used and low costs and low environmental load can be realized while maintaining the quality stability of the polymer film.

According to the present invention, washing water can be efficiently used and low costs and low environmental load can be realized while maintaining the quality stability of the polymer film.

DETAILED DESCRIPTION OF THE PREFERRED EMBODIMENTS

In the following preferred embodiments of the method and the apparatus of the present invention for alkaline saponification of a polymer film will be described in detail with reference to the accompanying drawings.

Figure 1:
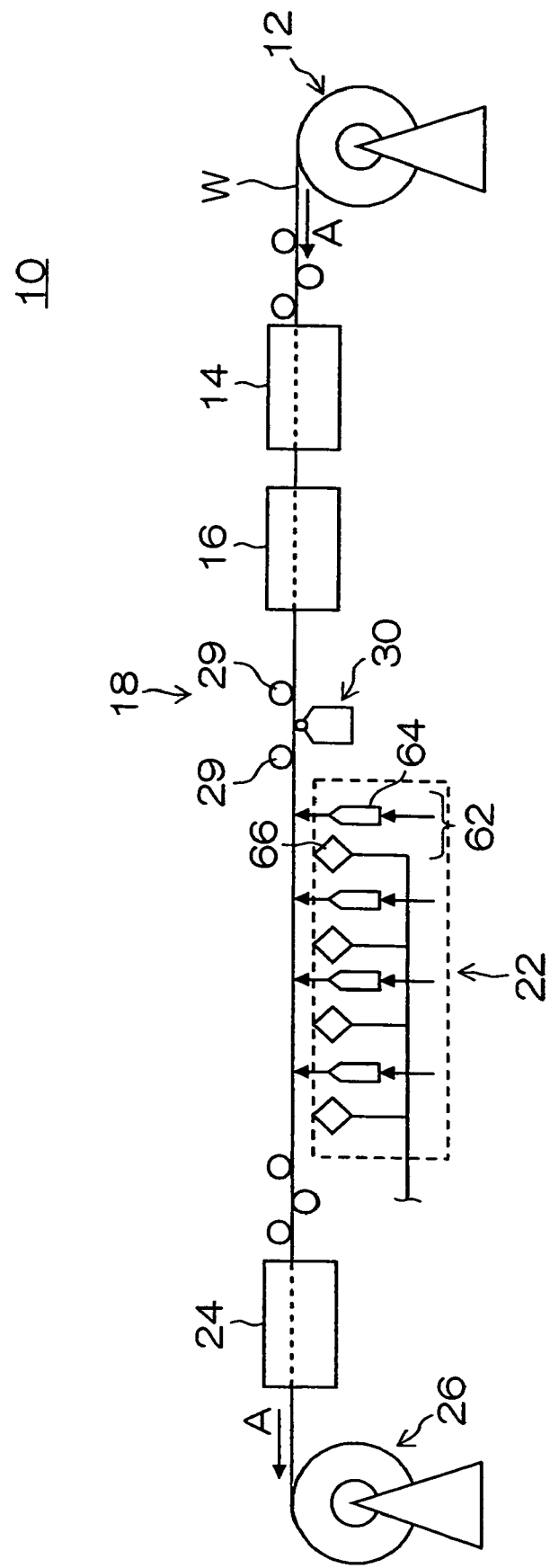
FIG. 1 is a diagrammatic view showing an alkaline saponification line of the present invention.

FIG. 1 is a diagrammatic view illustrating alkaline saponification line 10 to which the alkaline saponification method of the present invention is applied.

As shown in FIG. 1, alkaline saponification line 10 consists mainly of: alkaline solution coating section 14 in which an alkaline solution is applied to a polymer film (hereinafter referred to as web W); temperature keeping section 16 in which the web W having the alkaline solution coated on its surface is kept at room temperature or higher; reaction terminating section 18 in which the reaction is terminated by coating the web W kept at room temperature or higher with a diluting solvent or an acid solution; washing section 22 in which the alkaline solution is washed away from the web W on which the reaction has been terminated; and drying section 24 in which the washed web W is dried.

Alkaline solution coating section 14 includes a coating device, not shown in the figure, which coats the bottom surface of the web W delivered from delivery machine 12 with an alkaline solution.

The details of the web W and alkaline solution used in this embodiment will be described later.

As the coating device described above, a die coater (extrusion coater or slide coater), roll coater (forward roll coater, reverse roll coater or gravure coater), or rod coater (rod around which a thin metal wire has been wound) or the like is preferably used. A rod coater, gravure boater, blade coater or die coater, which can be operated stably even in the area to which only a small amount of alkaline solution is applied, is particularly preferably used. The coating device is, however, not limited to the above examples, but it may be a method that allows the whole web W to be immersed in the alkaline solution.

Desirably the amount of the alkaline solution coated is kept to a minimum, taking into consideration the disposal of liquid waste, because the alkaline solution is removed by washing with water afterwards. Preferably the amount is 1 to 100 $cc/m^2$ and more preferably 1 to 50 $cc/m^2$. Also preferably the fluctuation in coating amount across the width of the web W is kept less than 30%, and in coating amount per unit coating time is kept less than 30%.

The total number of the saponified sites (=the theoretical amount of alkali coating), which is obtained by multiplying the number of the sites, per unit area of the web W, on which saponification occurs by the saponifying depth required to develop the adhesion of the web W to an orientation film, gives a measure of the amount of the alkali coating required for the alkaline saponification reaction. The alkali is getting consumed with the progress of the saponification reaction, and the reaction rate becomes low. Thus, in practice, it is preferable to coat several times the above described theoretical amount of alkali. Specifically, the amount is preferably 2 to 20 times the theoretical amount of alkali coating and more preferably 2 to 5 times the same.

The temperature of the alkaline solution is desirably equal to the reaction temperature (=the temperature of the web W). To perform stable coating, preferably the temperature of the alkaline solution is lower than the boiling point of the alkaline solution, more preferably 5° C. lower than the boiling point of the alkaline solution, and most preferably 10° C. lower than the boiling point of the alkaline solution.

Temperature keeping section 16 includes a heating device, not shown in the figure, which keeps the web W at room temperature (about 15° C.) or higher after coating the alkaline solution and until terminating the saponification reaction.

As such a heating device, blowing of hot air against the opposite side to the side on which the coating is applied, contact heat transfer with a heating roll, induction heating with microwave, or radiation heating with an infrared heater is preferably used. Infrared heaters allow non-contact heating while avoiding air flow, and thus, use of an infrared heater can minimize the influence on the surface on which the alkaline solution has been coated and is preferable. As an infrared heater, an electric-, gas-, oil- or steam-type far infrared ceramic heater can be used. A commercially available infrared heater (e.g. one manufactured by Noritake Co., Limited) may also be used. An oil- or steam-type infrared heater, in which the heat transfer medium is oil or steam, is preferable from the viewpoint of explosion proofing in an atmosphere where an organic solvent coexists.

The temperature of the web W is set to 15° C. to 150° C., preferably 25° C. to 100° C., and more preferably 30° C. to 80° C. The temperature of the web W may be the same as or different from heated temperature of the web W before coated with the alkaline solution. To detect the temperature of the web W, a commercially available non-contact infrared thermometer can be used. And to control the temperature to keep it in the above temperature range, feedback control may be applied to the heating device.

The time to keep the web W in the above temperature range, after coating the alkaline solution and before washing away the same, is preferably 1 second to 5 minutes, more preferably 2 to 100 seconds, and particularly preferably 3 to 50 seconds, though depending on the conveying speed described below.

The conveying speed of the web W is determined depending on the combination of the composition of the above alkaline solution and the coating method employed. Generally preferably the conveying speed of the web W is 10 to 500 m/min and more preferably 20 to 300 m/min.

Preferably the web W undergoes saponification treatment in an atmosphere where the oxygen concentration is in the range of 0 to 18%, more preferably in the range of 0 to 15%, and most preferably in the range of 0 to 10%. Applying a saponifying coating solution (alkaline solution) in an atmosphere of low oxygen concentration makes it possible to control the surface characteristics of the web W, thereby obtaining a highly adhesive surface. The gaseous component, other than oxygen, in the atmosphere is preferably an inert gas (e.g. nitrogen, helium or argon) and particularly preferably nitrogen.

Reaction terminating section 18 includes bar coater 30 which coats the web W with a diluting solvent so as to lower the alkali concentration, thereby terminating the saponification reaction of the alkaline solution with the web W. The method of coating the diluting solvent is the same as that of coating the alkaline solution.

The diluting solvent is a solvent in which the alkali agent in the alkaline solution is dissolved. As such a diluting solvent, water or a mixed solution of an organic solvent and water is preferably used and water is more preferably used. Besides, an organic solvent used in the above described alkaline saponification can be preferentially used. Two or more kinds of organic solvents may also be used in the form of a mixture.

The amount of the diluting solvent to be coated is determined depending on the concentration of the alkaline solution. In case of bar coater 30, since the flow in the coating beads is not uniform, the alkaline solution and the diluting solvent are mixed and the mixed solution is coated again. Thus, it is difficult, in this case, to specify the diluting rate by the amount of diluting solvent coated, and therefore, the alkali concentration after coating of the diluting solvent needs to be measured. The amount of diluting solvent to be coated is preferably such that it brings a 1.5- to 10-fold dilution of the original alkali concentration and more preferably a 2- to 5-fold dilution.

To terminate the saponification reaction with an alkali quickly, besides the above diluting solvent, an acid can also be used. In this case, to neutralize the alkali with a smaller amount of acid, a strong acid is preferably used. Considering the easiness of water-washing operation, it is preferable to select an acid which undergoes neutralization reaction with an alkali to form a salt highly soluble in water. For example, hydrochloric acid, nitric acid, sulfuric acid, phosphoric acid, chromic acid, methanesulfonic acid or citric acid is preferably used.

The amount of acid solution to be coated is determined depending on the kind and concentration of the alkaline solution. Preferably, the amount is determined so that it gives a pH of 4 to 9 after coating of acid solution and more preferably a pH of 6 to 8.

Washing section 22 is a section in which the alkaline solution remaining on the surface of the web W is washed away and removed so that the alkaline solution is prevented from affecting the film formation or orientation of liquid crystal molecules of the orientation film and liquid crystal molecule layer, which are to be applied afterwards.

Figure 2:
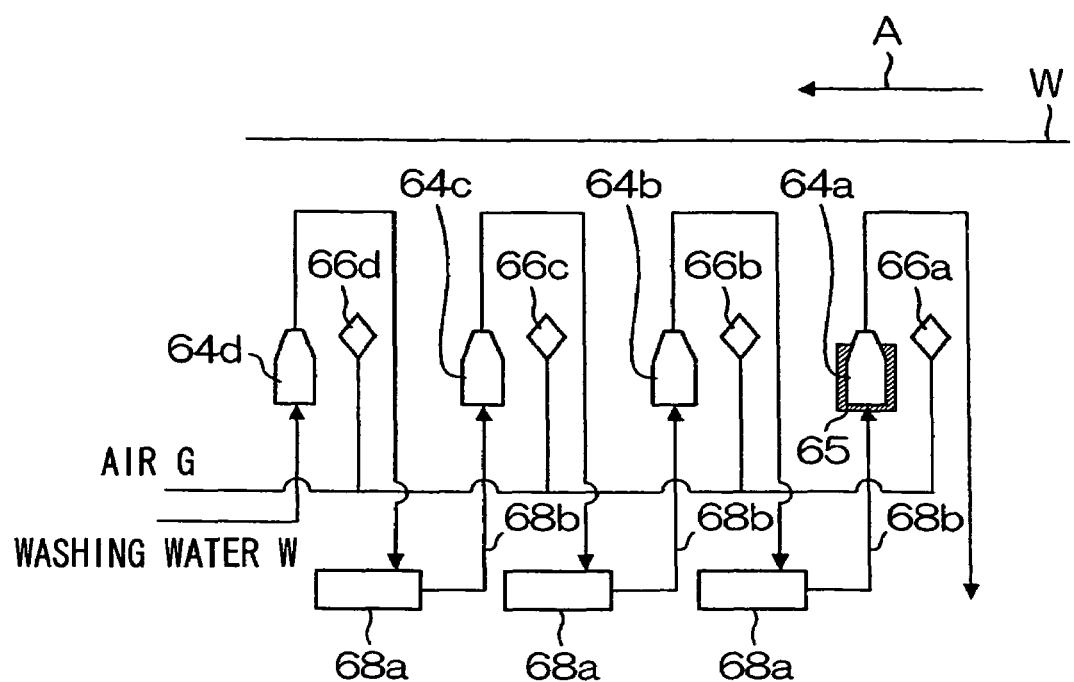
FIG. 2 is a schematic view showing the configuration of a washing section of the present invention.

First, the configuration of washing section 22, which is a section characteristic of the present invention, will be described in detail. FIG. 2 is a schematic view illustrating the configuration of washing section 22 of the present invention.

As shown in FIG. 2, in washing section 22, 4 water-washing/draining units 62, each including water-washing device 64 (64a~64d) which sprays washing water directly on the web W to wash the alkaline solution away from the web W and draining device 66 (66a~66d) which removes the water film remaining, due to water-washing device 64, on the surface of the web W, are provided along the travel direction of the web W.

Although this embodiment will be described giving an example where 4 water-washing/draining units 62 are installed in washing section 22, the number of water-washing/draining units 62 installed is not limited to 4, a number of water-washing/draining units 62 may be arranged in tandem. From the viewpoint of installation space or cost, usually 2 to 10 and preferably 2 to 5 water-washing/draining units 62 are installed.

As water-washing devices 64 described above, spray nozzles which spray washing water directly on the web W are suitably used. Such spray nozzles are arranged across the width of the web W so that the water stream impacts against the full width of the web W.

As the spray nozzles, commercially available spray nozzles (e.g. ones manufactured by IKEUCHI Co., Ltd. or Spraying Systems Co., Japan) may also be used. Arranging spray nozzles in such a manner makes it possible to wash the alkaline solution away from the web W while conveying the web W continuously, and besides, the jet of washing water from the spray nozzles allows highly turbulent mixing of washing water and the alkaline coating solution on the web W, thereby enhancing the washing effect. Water-washing devices 64 described above are not limited to the above example, but methods using coating heads (e.g. fountain coaters or frog mouth coaters) can also be used.

The speed at which washing water is sprayed in water-washing device 64 is in such a range that allows highly turbulent mixing and keeps the conveying stability of the web W. Specifically, it is preferably 50 to 1000 cm/sec, more preferably 100 to 700 cm/sec, and much more preferably 100 to 500 cm/sec.

The amount of the washing water used in the water-washing operation is larger than the amount derived from the theoretical dilution defined below.

Theoretical dilution=amount of washing water used [cc/m$^2$]÷amount of alkaline saponification solution coated [cc/m]

Specifically, theoretical dilution is defined based on the assumption that the whole amount of the water used in the water-washing operation contributes to the dilution mixing of the alkaline coating solution. In actuality, however, complete mixing does not occur, and thus, the amount of washing water used exceeds the amount derived from the theoretical dilution. The amount of the washing water used is at least 100 to 1000 times the amount derived from the theoretical dilution, preferably 500 to 10000 times, and more preferably 1000 to 100000 times, though it depends on the alkali concentration of the alkaline coating solution used, or the kind of the secondary additives or solvent used.

When a fixed amount of washing water is used in the water-washing operation, it is preferable not to use the whole amount of water at a time, but to use by batch washing process in which the water is used batchwise. Specifically, a proper time (distance) is provided between one water-washing device 64 and the next water-washing device 64 so that the dilution of the alkaline coating solution by diffusion is allowed to progress.

The washing water is preferably deionized water. The deionized water used in this embodiment is preferably such that its specific electric resistance is at least 0.1 MΩ or higher, in metal ion content, particularly sodium, potassium, magnesium or calcium content is lower than 1 ppm, and its anion, such as chloride or nitrate anion, content is lower than 0.1 ppm.

In the present invention, it is important, from the viewpoint of washing power, to keep the washing water at room temperature or higher. The higher the temperature of the washing water becomes, the easier the contaminants (alkaline solution etc.) becomes to wash away and remove. Accordingly, preferably the temperature of the washing water is in the range of 5 to 90° C., more preferably in the range of 25 to 80° C., and much more preferably in the range of 25 to 60° C. Most preferably the temperature is set to 37° C.

Temperature controlling device 65 which controls the temperature of the washing water is provided on water-washing device 64, piping which delivers the washing water, etc. As such temperature controlling device 65, any one of various types of heater and various types of heat insulator or thermal insulator, or a device for keeping the atmospheric temperature of the entire washing section at a prescribed temperature is used. Any other device may also be used, as long as it can keep the temperature of the washing water at a given level.

Although temperature controlling device 65 described above may be provided on the entire part of washing section 22, it may also be provided, as shown in FIG. 2, only on water-washing device 64 that washes the web W with highest contaminant concentration (alkali concentration etc.) and the piping in the vicinity of water-washing device 64.

As draining device 66 described above, a blade used in blade coater, an air-knife used in air-knife coater, a rod used in rod coater, or a roll used in roll coater is used. Of these devices, an air-knife is preferably used because it can decrease the thickness of the water film to the utmost limit.

Although the amount of the air blown off in draining device 66 varies depending on the original thickness of the water film on the web W or the conveying speed of the web W, generally air blown at 10 to 500 m/sec, preferably 20 to 300 m/sec, and more preferably 30 to 200 m/sec is used.

If the clearance between the surface of the web W conveyed and the air plenum of the air-knife is made small, the draining performance is improved; but on the other hand, the air-knife is more likely to come in contact with the web W and scratch the same. Thus, the clearance is kept in the proper range. Generally an air-knife is installed while keeping the clearance 10 μm to 10 cm, preferably 100 μm to 5 cm, and more preferably 500 μm to 1 cm. A back-up roll may be installed, in such a manner as to face the air-knife, on one side of the web opposite to the side undergoing water washing so that the setting of the clearance is stabilized and the effect of the flapping, wrinkles or deformation of the web W is alleviated.

Washing water recovering/feeding device 68 recovers the washing water splashing over the web W (used washing water) and supplies to the next water-washing device 64.

Washing water recovering/feeding device 68 (68a, 68b) consists mainly of: tank-like washing water recovery portion 68a which is provided under the web W and recovers and accumulates the washing water splashing over the web W; piping 68b which feeds the recovered washing water to the upstream water-washing device 64; and a water-delivery pump (not shown in the figure).

Washing water recovery portion 68a takes the form of a tank or catch pan having a shape and a size that allow the recovery of the washing water sprayed over and splashing over the web W. Washing water recovery portion 68a is in communication with piping 68b, which is connected to the upstream water-washing device 64, via a water-delivery pump (not shown in the figure).

In the following the arrangement and connecting state of water-washing device 64, draining device 66 and washing water recovering/feeding device 68 in this embodiment will be described.

Considering the fact that the contaminant concentration (alkali concentration) on the surface of the web W is decreased toward the travel direction of the web W, washing section 22 is so configured that washing water of high purity is fed from the downstream part of the section toward the upstream part, that is, in the direction opposite to the travel direction of the web W and the washing water used in one water-washing device is reused in the next water-washing device.

As described above, four water-washing devices 64 are provided from the downstream part of washing section 22 toward the upstream section, that is, in the direction opposite to the travel direction of the web W in the following order: water-washing device 64d→draining device 66d→washing water recovering/feeding device 68→water-washing device 64c draining device 66c→washing water recovering/feeding device 68→water-washing device 64b→draining device 66b→washing water recovering/feeding device 68→water-washing device 64a→draining device 66a.

First, washing water recovery portion 68a is provided which recovers the washing water used for washing the web W and fed through water-washing device 64d and draining device 66d. And washing water recovery portion 68a is connected to the preceding water-washing device 64c, via piping 68b.

Likewise, another washing water recovery portion 68a is provided which recovers the washing water used for washing the web W and fed through water-washing device 64c and draining device 66c. And this washing water recovery portion 68a is connected to the preceding water-washing device 64b, via piping 68b.

Further, still another washing water recovery portion 68a is provided which recovers the washing water used for washing the web W and fed through water-washing device 64b and draining device 66b. And this washing water recovery portion 68a is connected to the preceding water-washing device, water-washing device 64a, via piping 68b.

The washing water used for washing the web W and fed through water-washing device 64a and draining device 66a is discarded.

As described above, the washing section 22 is so configured that the washing water used in the water-washing step performed in a downstream water-washing device is used in the water-washing step performed in the water-washing device just upstream of the downstream water-washing device stepwise from the water-washing step performed in the most downstream water-washing device upward; thus, the washing water used in the water-washing step performed in a downstream water-washing device and having a relatively low contaminant concentration can be used in the water-washing step performed in the water-washing device upstream of the downstream water-washing device where the contaminant concentration of the web W is high.

Drying section 24 includes a drying device, not shown in the figure, which removes the washing water etc. remaining on the web W and heat dries the web W, before the web W is wound up into a roll, to adjust the web's moisture content to a preferred level. On the other hand, drying section 24 can also perform moisture conditioning with air having a set humidity.

As such a drying device, a known heat drying device is used which supplies clean air having been heated by a heater etc. The temperature of the dry air is preferably 30 to 200° C., more preferably 40 to 150° C., and particularly preferably 50 to 120° C. When the water film is fully removed from the web W by a draining device 66, such as an air-knife, in the preceding section, drying section 24 need not be provided.

The web W having undergone alkaline saponification as above may be wound up with wind-up machine 26 once or may be provided with a functional layer subsequently after the above saponification treatment step. In either case, one side of the web W, which has undergone saponification treatment as described above, and the other side of the web W can be prevented from adhering to each other even when the web W is wound up into a roll.

In the following the polymer film (web W) and alkaline solution used in the alkaline saponification of the present invention will be described in detail.

The flow of the alkaline saponification of a polymer film using alkaline saponification line 10 shown in FIG. 1 will be described.

First, a web W is delivered from the delivery machine 12.

The web W is delivered, while being guided by guide rollers 28, to alkaline solution coating section 14 where its surface is coated with an alkaline solution. Then the web W is conveyed to temperature keeping section 16 where it undergoes saponification reaction with the alkaline solution.

The web W having undergone saponification reaction in temperature keeping section 16 is conveyed to reaction terminating section 18, where the surface of the web W on which the alkaline saponification solution has been formed by the bar coater 30 is coated with a diluting solvent to terminate the alkaline saponification reaction.

After that, the web W is conveyed to washing section 22, which is a section characteristic of the present invention. As shown in FIG. 2, of four water-washing devices 64 (64a~64d), water-washing device 64d provided most downstream relative to the travel direction of the web W is firstly fed with washing water first.

The washing water sprayed on the web W by water-washing device 64d and in the form of a water film on the web W is removed by the air blown on the web W by draining device 66d. The washing water having passed through water-washing device 64d and draining device 66d and having splashed over the web W is recovered in washing water recovery portion 68a. The washing water having been recovered in washing water recovery portion 68a is delivered, by a water-delivery pump (not shown in the figure), to water-washing device 64c just upstream of water-washing device 64d through piping 68b.

The washing water having been delivered to water-washing device 64c is sprayed on the web W, then removed by the air blown on the web W by draining device 66c, and recovered in washing water recovery portion 68a, just like above. Then the recovered washing water is delivered to water-washing device 64b just upstream of water-washing device 64c through piping 68b.

The above described steps are repeated, whereby the washing water used in the water-washing step performed in a downstream water-washing device and having a relatively low contaminant concentration can be used in the water-washing step performed in the water-washing device upstream of the downstream water-washing device where the contaminant concentration of the web W is high. Thus, the washing water can be reused with its washing power kept sufficient to wash the web W.

The web W having been washed is conveyed to drying section 24 where it is heat dried so that the water/solvent is removed from it. After that, the web W is wound up by wind-up machine 26.

As described so far, in the washing step in the alkaline saponification method of the present invention, washing water is recovered and reused, whereby washing water can be efficiently used and low costs and low environmental load can be realized while maintaining the quality stability of the polymer film.

Figure 3:
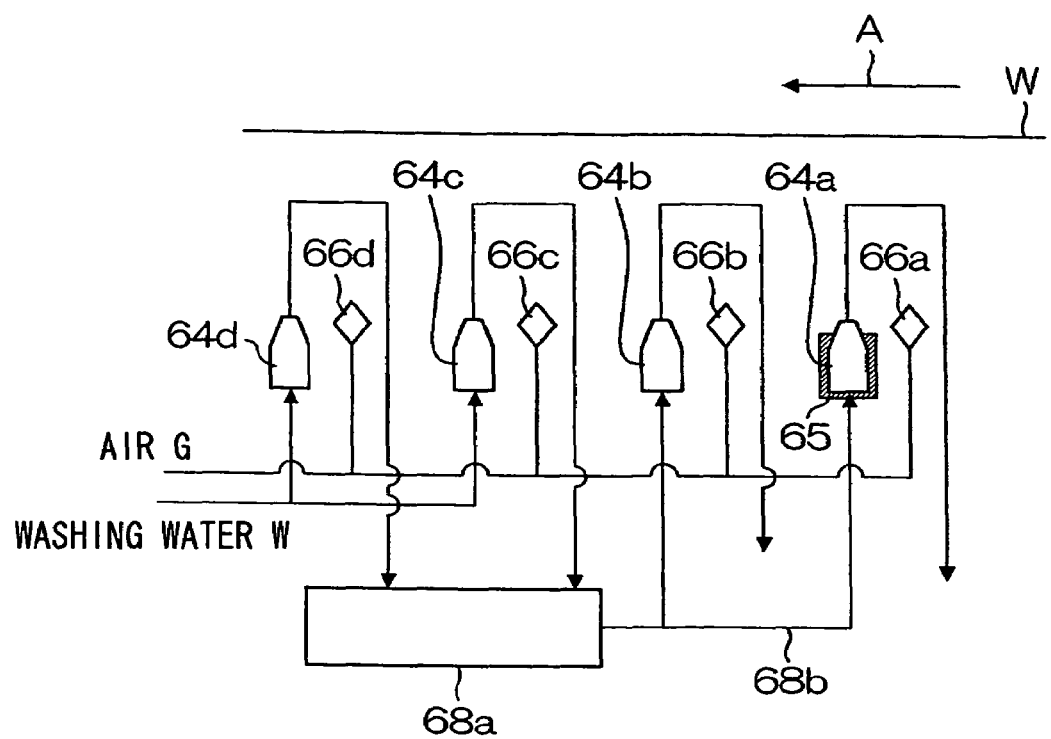
FIG. 3 is a schematic view showing the configuration of a washing section of the present invention.

In the following the second embodiment of washing section 22 of the present invention will be described. FIG. 3 is a view illustrating one example of installation of washing section 22 in accordance with the second embodiment of the present invention.

The washing section in accordance with this embodiment is so configured that the water used in two downstream water-washing/draining units 62 is recovered simultaneously and fed to two upstream water-washing devices simultaneously.

Specifically, as shown in FIG. 3, the washing section of the second embodiment is configured in the same manner as that of the first embodiment, provided that washing water recovery portion 68a and piping 68b are connected so that the washing water is recovered from two downstream water-washing devices 64d, 64c simultaneously and fed to two upstream water-washing devices 64b, 64a simultaneously.

In washing section 22 of the second embodiment, washing water recovery portion 68a is provided which recovers simultaneously the washing water having passed through water-washing device 64d, draining device 66d, water-washing device 64c and draining device 66c to be used for washing the web W (the washing water having splashed over the web W). Washing water recovery portion 68a is connected with piping 68b. Piping 68b is connected to two upstream water-washing devices 64b, 64a so that it can distribute the washing water to the two upstream water-washing devices via a water-delivering pump, not shown in the figure.

The function of washing section 22 of this embodiment will be described.

Fresh washing water is distributed, in the opposite direction to the travel direction of the web W, to two downstream water-washing devices 64d, 64c. Then, the washing water is sprayed on the web W by water-washing devices 64d, 64c, allowed to splash over the web W by draining devices 66d, 66c, and recovered in washing water recovery portion 68a. The recovered washing water is delivered to two upstream water-washing devices 64b, 64a by a water-delivery pump, not shown in the figure, via piping 68b. Thus, according to the alkaline saponification method of the present invention, washing water can be efficiently used and low costs and low environmental load can be realized while maintaining the quality stability of the polymer film.

While the present invention has been described in terms of the apparatus in accordance with the second embodiment, it is to be understood that the invention is not limited thereto, but may be otherwise variously embodied within the spirit and scope of the invention.

Although an example has been described in this embodiment in which fresh washing water is distributed to two downstream water-washing devices 64d, 64c, and the used washing water is recovered simultaneously and distributed to two upstream water-washing devices 64b, 64a, the washing section is, for example, so configured that fresh washing water is distributed to three downstream water-washing devices 64b, 64c, 64d and the used washing water is recovered simultaneously and fed to upstream water-washing device 64a.

In the following the third embodiment of washing section 22 of the present invention will be described. Washing section 22 in accordance with the third embodiment includes controlling device 72 for keeping the contaminant concentration (alkali concentration etc.) of the washing water in washing water recovery portion 68a at a prescribed value.

Figure 4:
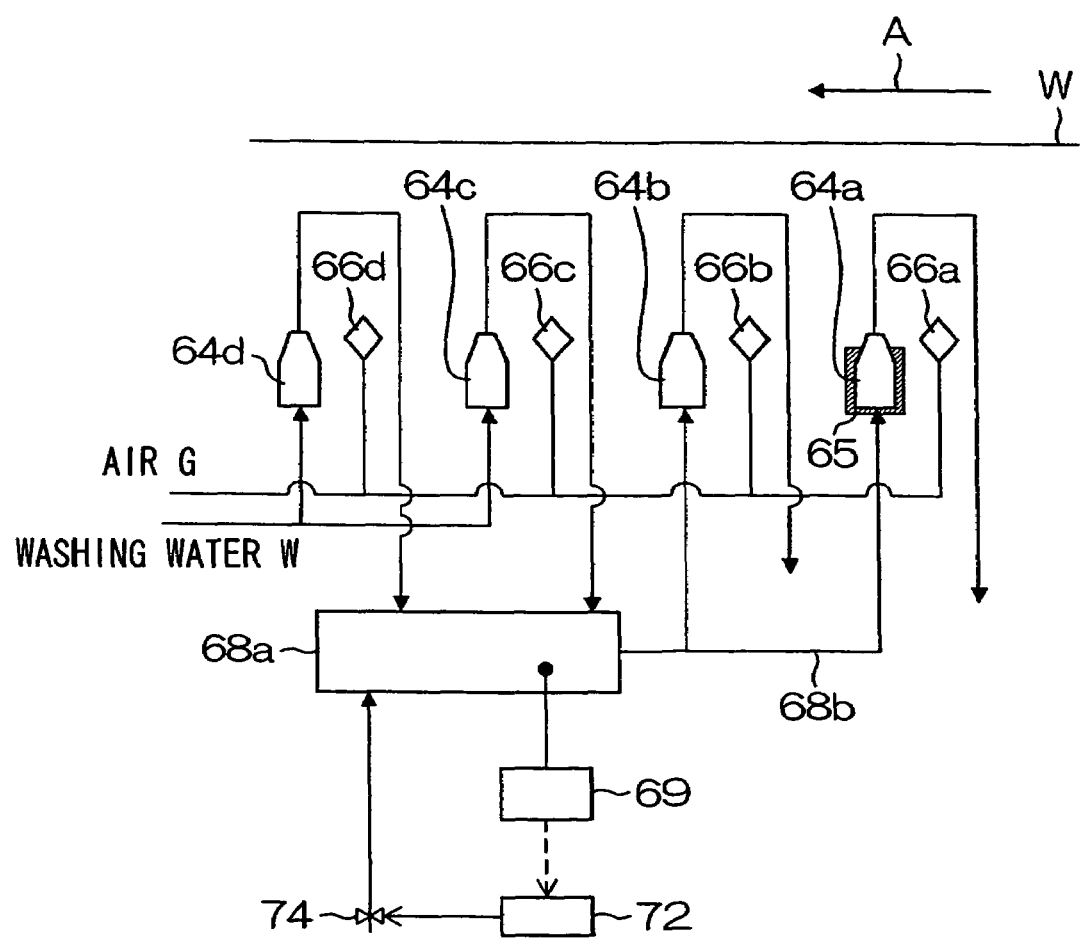
FIG. 4 is a schematic view showing the configuration of a washing section of the present invention.

FIG. 4 is a view illustrating one example of installation of washing section 22 in accordance with the third embodiment of the present invention.

Specifically, as shown in FIG. 4, the washing section 22 of the third embodiment is configured in the same manner as that of the second embodiment, provided that it includes; contaminant concentration (alkali concentration etc.) measuring device 69 in washing water recovery portion 68a of the second embodiment; controlling device 72 which controls feeding diluting water according to the measured concentration, to washing water recovery portion 68a; and valve 74 which feeds diluting water according to the signal from controlling device 72.

Measuring device 69 measures the contaminant concentration (alkali concentration etc.) of the washing water in washing water recovery portion 68a. Measuring device 69 includes a signal transformation portion which transforms the measured signals into electric signals, and the measured signals transformed into electric signals by the signal transformation portion is output to controlling device 72. A plurality of measuring portions may be provided so that variations in contaminant concentration (alkali concentration etc.) in washing water recovery portion 68a with position are decreased and the contaminant concentration is kept uniform.

Controlling device 72 controls the valve for diluting water based on the measured signals so that the contaminant concentration (alkali concentration etc.) in washing water recovery portion 68a becomes a target value set in advance(feedback control). The amount of the diluting water fed is adjusted by the opening of the valve.

Thus, the contaminant concentration (alkali concentration etc.) in washing water recovery portion 68a is kept at a prescribed value or lower, whereby troubles such as decrease in the washing power of washing water used in the upstream water-washing devices 64b, 64a do not occur. Thus, washing water can be efficiently used and low costs and low environmental load can be realized while maintaining the quality stability of the polymer film.

While the present invention has been described in terms of the apparatus in accordance with the third embodiment, it is to be understood that the invention is not limited thereto, but may be otherwise variously embodied within the spirit and scope of the invention.

Although an example has been described in this embodiment in which the washing water used in the two down stream water-washing devices is recovered, and the recovered water is used in the two upstream water-washing devices while keeping the contaminant concentration (alkali concentration etc.) at a prescribed value or lower, the washing section is, for example, so configured that fresh washing water is distributed to all the water-washing devices, almost all of the used washing water is recovered in washing water recovery portion 68a, where as described above the contaminant concentration (alkali concentration etc.) of the washing water is controlled so that it is at a prescribed value or lower, and again the washing water having a controlled contaminant concentration (alkali concentration etc.) is distributed to all the water-washing devices. The apparatus of the present invention may be variously embodied.

Polymer Film (Web W)

The polymer film (web W) used in this embodiment preferably has a light transmittance of 80% or higher. The web W is preferably such that it is less likely to become birefringent when subjected to external force. The web W includes a hydrolysable bond (bond subject to saponification treatment) such as ester or amide bond. Preferably the web W is an ester bond and more preferably an ester bond in the side chain of the polymer. A typical polymer having an ester bond in the side chain is a cellulose ester. Preferably the cellulose ester is a lower fatty acid ester of cellulose, more preferably cellulose acetate, and most preferably cellulose acetate having an acetylation degree of 59.0 to 61.5%. The term "acetylation degree" means the amount of acetic acid bonded per unit mass cellulose. The acetylation degree is obtained in accordance with the measurement and calculation of acetylation degree stipulated in ASTM: D-817-91 (testing method for cellulose acetate etc.).

The average viscometric degree of polymerization (DP) of the cellulose ester is preferably 250 or higher and more preferably 290 or higher. Preferably the cellulose ester used in the present invention has a narrow molecular weight distribution, Mw/Mn (Mw represents mass average molecular weight and Mn number average molecular weight), obtained by gel permeation chromatography. Specifically, the preferred Mw/Mn value is 1.0 to 1.7.

When the web W is used as an optical compensation sheet, preferably the web W has high retardation values. The Re retardation value and Rth retardation value of the web W are defined by the following expressions (I) and (II).

$$Re = |nx - ny| \times d \quad \text{(I)}$$

$$Rth = \{(nx+ny)/2 - nz\} \times d \quad \text{(II)}$$

In the above expressions (I) and (II), nx represents the refractive index in the web W plane in the slow-axis direction (in the direction in which the refractive index reaches a maximum), ny the refractive index in the web W plane in the fast-axis direction (in the direction in which the refractive index reaches a minimum), nz the refractive index across the thickness of the web W, and d the thickness of the web W in nm. Preferably, the Re retardation value of the web W is 1 to 200 nm and the Rth retardation value of the web W is 70 to 400 nm. The specific values are obtained by extrapolating the Re and Rth values measured while inclining the incident direction of measuring light relative to the vertical direction to the web W plane. The measurement can be made using ellipsometer (e.g. M-150, manufactured by JASCO, Co., Jap.). The measuring wavelength employed is 632.8 nm (He—Ne laser).

To adjust the retardation of the web W, generally a method is employed in which external force such as drawing is applied to the web W; however, a retardation increasing agent, which adjusts optical anisotropy, may also be added depending on the situation. To adjust the retardation of cellulose acylate films, preferably an aromatic compound having at least two aromatic rings is used as a retardation increasing agent. The amount of the aromatic compound used is preferably in the range of 0.01 to 20 parts by mass per 100 parts of cellulose acylate. Two or more kinds of aromatic compounds may also be used in combination. The aromatic rings of the aromatic compounds include not only aromatic hydrocarbon rings, but also aromatic heterocycles.

Preferably the polymer film is produced by a solvent cast method. In the solvent cast method, a film is produced using a solution of a polymer material in an organic solvent (dope). Preferably the organic solvent used includes a solvent selected from the group consisting of: ethers having 3 to 12 carbon atoms, ketones having 3 to 12 carbon atoms, esters having 3 to 12 carbon atoms, and hydrocarbon halides having 1 to 6 carbon atoms. The ethers, ketones and esters may have a cyclic structure. A compound having two or more functional groups of ethers, ketones and esters (i.e. —O—, —CO— and —COO—) can also be used as an organic solvent. The organic solvent used may have other functional groups such as alcoholic hydroxyl group. In organic solvents having two or more kinds of functional groups, the number of carbon atoms is not limited, as long as it is within the range specified with respect to the compound having any one of the functional groups.

Examples of ethers having 3 to 12 carbon atoms include: diisopropyl ether, dimethoxymethane, dimethoxy ethane, 1,4-dioxane, 1,3-dioxolane, tetrahydrofuran, anisole and phenetole. Examples of ketones having 3 to 12 carbon atoms include: acetone, methyl ethyl ketone, diethyl ketone, diisobutyl ketone, cyclohexanone and methylcyclohexanone. Examples of esters having 3 to 12 carbon atoms include: ethyl formate, propyl formate, pentyl formate, methyl acetate, ethyl acetate and pentyl acetate. Examples of organic solvents having two or more kinds of functional groups include: 2-ethoxyethyl acetate, 2-methoxyethanol and 2-butoxyethanol. Preferably the number of carbon atoms of the hydrocarbon halides is 1 or 2 and most preferably 1. The halogen of the hydrocarbon halides is preferably chlorine. The percentage of the hydrogen atoms of the hydrocarbon halides replaced with halogen is preferably 25 to 75% by mole, more preferably 30 to 70% by mole, much more preferably 35 to 65% by mole, and most preferably 40 to 60% by mole. Methylene chloride is a typical hydrocarbon halide. Two or more kinds of organic solvents may be used in the form of a mixture.

The polymer solution can be prepared by a commonly used process. The commonly used process means treating at 0° C. or higher (at ordinary temperature or a high temperature). The solution can be prepared using the process and apparatus for preparing a dope in a commonly used solvent cast method. When employing a commonly used process, it is preferable to use a hydrocarbon halide (particularly methylene chloride) as an organic solvent. The amount of the polymer used is adjusted so that the polymer content in the resultant solution is 10 to 40% by mass. The amount of the polymer in the resultant solution is preferably 10 to 30% by mass. To the organic solvent (prime solvent), any of the additives described later may be added in advance. The solution can be prepared by stirring the polymer and the organic solvent at ordinary temperature (0 to 40° C.). In a highly concentrated solution, stirring may be performed under pressure and heating. Specifically, the polymer and the organic solvent are put into a pressure container, and the mixture is stirred, with the container made airtight, under pressure and heating at temperatures of the boiling point of the solvent at ordinary temperature or higher and of not allowing the boiling of the solvent. The heating temperature is usually 40° C. or higher, preferably 60 to 200° C., and more preferably 80 to 110° C.

The ingredients may be roughly mixed before they are introduced into a container. Or they are introduced into a container one by one. The container used need to be so constructed as to allow stirring in it. The container can be brought to the pressurized state by introducing an inert gas such as nitrogen into it. The increase in the vapor pressure of the solvent by heating can also be utilized. Or the ingredients may be added under pressure after making the container airtight. When heating the ingredients, it is preferable to heat them from the outside of the container. For example, a heater having a jacket structure may be used to heat them from outside. Or a method can also be employed in which the entire container is heated by providing a plate heater and piping on the outside of the container and circulating a fluid through the piping. It is also preferable to provide a stirring blade inside the container and perform stirring using the blade. Preferably the stirring blade is so long that it can almost reach the inside wall of the container. Preferably a scraper blade is provided at the end of the stirring blade to replace the fluid film on the wall of the container. The container may be equipped with instruments such as pressure gauge and thermometer. In the container, the ingredients are dissolved in the solvent. The resultant dope is cooled and then taken out from the container, or it is taken out from the container and then cooled using a heat exchanger or the like.

The solution can also be prepared by cooling-dissolving process. By the cooling-dissolving process, polymer can be dissolved in an organic solvent in which polymer is hard to dissolve by any one of commonly used dissolving processes. Even when a solvent is used in which polymer can be dissolved by a commonly used process, if the cooling-dissolving process is employed, a homogeneous solution can be obtained rapidly. In the cooling-dissolving process, first, polymer is added to the organic solvent little by little at room temperature under stirring. Preferably the amount of the polymer used is adjusted so that the polymer content in the mixture is 10 to 40% by mass and more preferably 10 to 30% by mass. To the mixture, any of the additives described later may be added in advance.

Then, the mixture is cooled to −100° C. to −10° C., preferably −80° C. to −10° C., more preferably −50° C. to −20° C., and most preferably −50° C. to −30° C. Cooling can be performed in, for example, a dry ice/methanol bath (−75° C.) or cold diethylene glycol solution (−30 to −20° C.). Such a cooling operation allows the mixture of the polymer and organic solvent to be solidified. The cooling rate is preferably 4° C./min or higher, more preferably 8° C./min or higher, and most preferably 12° C./min or higher. The term "cooling rate" herein used means the value obtained by dividing the difference between the temperature at the time of starting cooling and the temperature at the time of completing cooling by the time from starting cooling to completing cooling.

Then, the above cooled mixture is heated to 0 to 200° C., preferably 0 to 150° C., more preferably 0 to 120° C., and most preferably 0 to 50° C. to dissolve the polymer in the organic solvent. Heating may be performed simply by leaving the mixture stand at room temperature or in a warn bath. The heating rate is preferably 4° C./min or higher, more preferably 8° C./min or higher, and most preferably 12° C./min or higher. The term "heating rate" herein used means the value obtained by dividing the difference between the temperature at the time of starting heating and the temperature at the time of completing heating by the time from starting heating to completing heating. The above operations allow a homogeneous solution to be produced. When the polymer is not fully dissolved in the solvent, such cooling and heating operations may be repeated. Whether the polymer is fully dissolved in the solvent or not can be judged simply by visually observing the appearance of the solution.

In the cooling-dissolving process, to avoid the inclusion of moisture due to the moisture condensation at the time of cooling, desirably a closed top container is used. In the cooling and heating operations, if pressure is applied during cooling and pressure is reduced during heating, the time required for dissolving the polymer can be decreased. To perform pressurization and depressurization, desirably a pressure resistant container is used. Measurement by differential scanning calorimetry (DSC) has revealed that in a 20% by mass solution of cellulose acetate (acetylation degree: 60.9%, average viscometric degree of polymerization: 299) in methyl acetate prepared by the cooling-dissolving process, there exists a pseudo sol-gel phase transition point at around 33° C. And at temperatures lower than the temperature, the solution is in the homogeneous gel state. Thus, the solution needs to be kept at temperatures equal to or higher than the pseudo phase transition point and preferably of about gel phase transition temperature plus about 10° C. It is to be understood that the pseudo phase transition point varies depending on the acetylation degree, average viscometric degree of polymerization or concentration of the cellulose acetate, or the organic solvent used.

A polymer film is formed using the prepared polymer solution (dope) by a solvent cast method. A film is formed by casting the dope over a drum or band and vaporizing the solvent. Preferably, the concentration of the dope before casting is adjusted so that its solid content is 18 to 35%. Also preferably, the surface of the drum or band is planished mirror finished surface in advance. Preferably the dope is cast over a drum or band whose surface temperature is kept at 10° C. or lower. Preferably air is blown on the dope after casting for 2 seconds or longer to dry the dope. The residual solvent can be vaporized by stripping the resultant film off from the drum or band and drying the same with hot air while varying the temperature of the hot air from 100 to 160° C. This operation allows the time from casting to stripping to be shortened. To perform this method, the dope must be gelled at the temperature of the drum or band surface at the time of casting.

To improve the mechanical properties or enhance the drying speed, to the web W, a plasticizer can be added. As such a plasticizer, a phosphate ester or carboxylate ester is used.

As such a plasticizer, a phosphate ester or carboxylate ester is used. The amount of the plasticizer added is preferably 0.1 to 25% by mass of the amount of cellulose ester, more preferably 1 to 20% by mass, and most preferably 3 to 15% by mass.

Further, to the web W in accordance with this embodiment, various additives (e.g. ultraviolet screening agents, fine particles, releasing agents, antistatics, deterioration inhibitor (e.g. antioxidants, peroxide decomposition agents, radical inhibitors, metal inactivating agents, acid scavengers or amines), or infrared absorbers) may be added depending on its application. The additives may be in the solid state or oily matter state. When the web W is multilayered, the layers may contain different kinds of or different amounts of additives. The amount of the additive used is not limited as long as they perform their function; however, it is preferably in the range of 0.001 to 20% by mass of the total composition of the web W.

The web W can be subjected to stretching treatment so that its retardation is adjusted. The percentage of stretching is preferably 3 to 100%. The thickness of the polymer film is preferably 30 to 200 μm and more preferably 40 to 120 μm.

Alkaline Solution

The alkaline solution used in this embodiment can be prepared by dissolving an alkali in water or in a mixed solution of an organic solvent and water. Preferably the organic solvent is an organic solvent or two or more kinds of organic solvents selected from the group consisting of: alcohols having 8 or less carbon atoms; ketones having 6 or less carbon atoms; esters having 6 or less carbon atoms; and polyvalent alcohols having 6 or less carbon atoms.

Examples of the organic solvents include: monovalent alcohols (e.g. methanol, ethanol, n-propanol, isopropanol, n-butanol, isobutanol, 2-butanol, cyclohexanol, benzyl alcohol, fluorinated alcohol); ketones (e.g. acetone, methyl ethyl ketone, methyl isobutyl ketone); esters (e.g. methyl acetate, ethyl acetate, butyl acetate); polyvalent alcohols (e.g. ethylene glycol, diethylene glycol, propylene glycol, glycerin); amides (e.g. N,N-dimethylformamide, dimethylformamide); sulfoxides (e.g. dimethylsulfoxide); and ethers (e.g. methyl cellosolve, ethylene glycol diethyl ether). Particularly preferable are methanol, ethanol, n-propanol, isopropanol, n-butanol, isobutanol, 2-butanol, acetone, methyl ethyl ketone, methyl isobutyl ketone, methyl acetate, ethyl acetate, ethylene glycol, diethylene glycol, propylene glycol and glycerin.

The organic solvent is required neither to dissolve the web W nor to allow the web W to swell. To make the coating of an alkaline saponification solution easier, desirably an organic solvent having an appropriately low surface tension is selected, as described in the section relating to the physical properties of alkaline solutions. The percentage of the organic solvent used in solvent is determined depending on the kind of the solvent, the miscibility with (solubility in) water, and reaction temperature and time. To complete saponification reaction in a short period of time, preferably the solution is adjusted to have a high concentration. However, too high a concentration of solvent might allow the components (plasticizer, etc.) in the web W to be extracted and the web W to swell excessively, and thus, proper selection is required. The mixing ratio of water to organic solvent is preferably 3/97 to 85/15, more preferably 5/95 to 60/40, and much more preferably 15/85 to 40/60. With the mixing ratio within the above range, the whole surface of the web W can undergo saponification treatment easily and uniformly without causing the deterioration of optical characteristics.

As an alkali agent in the alkaline solution, any one of inorganic bases and organic bases can be used. To allow saponification reaction at a low alkaline concentration, a strong base is preferably used. Such strong bases are preferably hydroxides of alkali metals (e.g. NaOH, KOH, LiOH); amines (e.g. perfluorotributylamine, triethylamine, diazabicyclononene, diazabicycloundecene); tetraalkylammoniumhydroxide (as the alkyl group, methyl, ethyl, propyl or butyl group); and free bases of complex salts (e.g. $[Pt(NH_3)_6](OH)_4$), more preferably hydroxides of alkali metals, and most preferably NaOH and KOH.

The concentration of the alkaline solution is determined depending on the kind of the alkali used, and the reaction temperature and time. To complete saponification reaction in a short period of time, preferably the alkaline solution is adjusted so that it has a high alkali concentration. However, too high an alkali concentration may sometimes decrease the stability of the solution and cause precipitation when coating is performed for a long time. Preferably the concentration of the alkaline solution is 0.1 to 5 N, more preferably 0.5 to 5 N, and most preferably 0.5 to 3 N.

The alkaline solution used in this embodiment may also contain surfactant. Addition of surfactant allows, even if any of the substances contained in the web W is extracted by the organic solvent, the substance to be present stably in the alkaline solution, thereby preventing the extracted substance from precipitating or being solidified in the subsequent washing step.

The surfactant used is not limited as long as it is soluble or dispersible in the alkaline saponification solution of the present invention. Any one of nonionic surfactant and ionic surfactant (anionic, cationic or ampholytic) can be suitably used; however, from the viewpoint of solubility and saponification performance, particularly, nonionic surfactant or anionic surfactant is preferably used (see Japanese Patent Application Laid-Open No. 2003-313326).

To the above alkaline solution, antifoaming agent any of organic solvents other than the above described ones, mildewproofing agents, antibacterial agents, and other additives (e.g. alkaline solution stabilizer (antioxidant etc.), water-soluble compounds (polyalkylene glycols, natural water-soluble resins, etc.)) may be added as solubility assistants for assisting the dissolution of surfactant or antifoamer in the alkaline solution.

Water used in the alkaline solution of this embodiment is preferably selected based on Japan Water Supply Law (Law No. 177, 1957) and the ministerial ordinance of water quality based thereon (Ordinance No. 56 of the Ministry of Health, Aug. 31, 1978), Japan Hot Spring Law (Law No. 125, Jul. 10, 1948, and the attached list thereof), and effects of elements or minerals in water prescribed by WHO Water Quality Standards.

Although the physical properties of the alkaline solution used in this embodiment are made up of the above described compositions, preferably the surface tension is 45 mN/m or lower and the viscosity is 0.8 to 20 mPa·s. The density of the alkaline solution is preferably 0.65 to 1.05 g/cm$^3$. Such physical properties make it possible to perform the coating of the alkaline solution stably and easily depending on the conveying speed, and besides, they fully realize the wettability by the solution on the surface of the web W, maintenance of the solution coated on the surface of the web W, and removability of the alkaline solution from the surface of the web W after saponification treatment.

EXAMPLES

The present invention will be described in detail by examples. It is to be understood that the examples herein shown are for the purpose of description and not of limitation.

In alkaline saponification line 10 shown in FIG. 1 (first half part), one side of a continuous web W of a cellulose acetate film (thickness: 100 μm, width: 1895 mm) was coated with an alkaline solution (1 N, KOH solution) in an amount of 14 cc/m². Then, the web W was subjected to alkaline saponification at 110° C. for about 7 seconds, and the treated surface of the web W was coated with deionized water in an amount of 3 cc/m² to dilute the alkaline solution. Then the web W was washed. The conveying speed of the web W was 20 m/min.

In washing section 22, the web W was washed while being conveyed at a speed of 20 m/min. The temperature of the washing water was set to 37° C.

Figure 5:
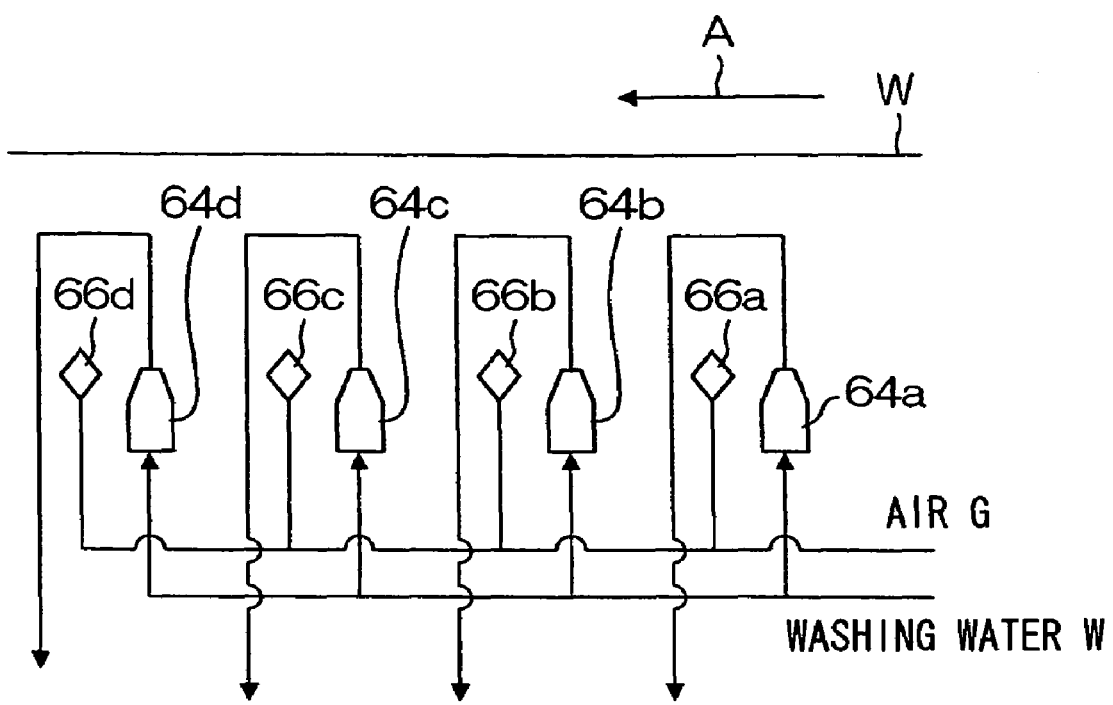
FIG. 5 is a schematic view showing the configuration of a washing section of prior art.

In Example 1, washing was performed in washing section 22 of FIG. 2, provided that the number of water-washing/draining units 62 was changed from 4 to 3. In Example 2, washing was performed in washing section 22 of FIG. 2 (the number of water-washing/draining units 62 was 4). In Example 3, washing was performed in washing section 22 of FIG. 3. In Comparative example 1, washing was performed in conventional washing section 22 of FIG. 5. In Examples 1 to 3 and Comparative example 1, the amount of water used in each washing section 22 was measured.

The washing section of Example 1 could reduce the amount of washing water used by about 50% over conventional washing section (FIG. 5) and the washing section of Example 2 could reduce the amount of washing water used by about 75% over the conventional washing section. The washing section of Example 3 could reduce the amount of washing water used by about 50% over conventional washing section.

The contaminant concentration (alkali concentration etc.) of the washing water between each two adjacent water-washing devices 64, 64 was also measured. The difference in concentration was about 1/100, which confirmed that the washing power of the washing water was no problem.

The effect of the remaining alkaline solution on the product quality (orientation) when reusing washing water was confirmed. In this case, the product quality of the optical compensation films produced by applying the washing methods of the present invention (Examples 1 to 3) was evaluated by measuring their degree of extinction by the following method.

Quality Evaluation by Degree of Extinction

Quality evaluation by degree of extinction was performed using extinction degree measuring instrument manufactured by OTSUKA ELECTRONICS CO., LTD. In the instrument, the measuring wave length was 550 nm and the transmittance of the polarizer in a parallel Nicols arrangement was 100%. The orientation was evaluated for two sheets of discotic liquid crystal in a crossed Nicols arrangement. In the orientation evaluation by degree of extinction, a higher degree of extinction indicates larger quality deterioration due to the remaining alkaline saponification solution.

The degree of extinction was measured for each of the polymer films produced using the washing methods of Examples 1 to 3 and Comparative example 1. The measurements confirmed that there was no significant increase in degree of extinction due to the remaining saponification solution in any of Examples 1 to 3 and the degree of extinction of Examples 1 to 3 was almost equal to that of Comparative example 1.

As described so far, in washing an alkaline saponification solution, if the present invention is applied, the washing water can be efficiently used and low costs and low environmental load can be realized while maintaining the quality stability of the polymer film.

What is claimed is:

1. A method for alkaline saponification of a polymer film, comprising the steps of:
    alkaline saponification of the polymer film with an alkaline solution; and
    washing away the alkaline solution from the alkali-saponified polymer film, wherein
    the washing step includes a plurality of water-washing steps of washing the alkaline solution coated on the polymer film away using washing water, along the travel direction of the polymer film, and the used washing water is reused, wherein
    in the plurality of water-washing steps, the washing water used in a downstream water-washing step is recovered and the recovered washing water is reused in a water-washing step upstream of the downstream water-washing step.

2. The method for alkaline saponification of a polymer film according to claim 1, wherein the washing water used in a downstream water-washing step is used, as washing water, in a water-washing step just upstream of the downstream water-washing stepwise from the most downstream water-washing step to the most upstream step.

3. A method for alkaline saponification of a polymer film, comprising the steps of:
    alkaline saponification of the polymer film with an alkaline solution; and
    washing away the alkaline solution from the alkali-saponified polymer film, wherein
    the washing step includes a plurality of water-washing steps of washing the alkaline solution coated on the polymer film away using washing water along the travel direction of the polymer film, and the used washing water is reused, wherein
    the washing step includes a plurality of sets of water-washing/draining steps comprising the water-washing step and a draining step, after the water-washing step, of removing the washing water present on the surface of the polymer film.

4. The method for alkaline saponification of a polymer film according to claim 1, wherein the washing step includes a plurality of sets of water-washing/draining steps comprising the water-washing step and a draining step, after the water-washing step, of removing the washing water present on the surface of the polymer film.

5. The method for alkaline saponification of a polymer film according to claim 2, wherein the washing step includes a plurality of sets of water-washing/draining steps comprising the water-washing step and a draining step, after the water-washing step, of removing the washing water present on the surface of the polymer film.

6. A method for alkaline saponification of a polymer film, comprising the steps of:
    alkaline saponification of the polymer film with an alkaline solution; and
    washing away the alkaline solution from the alkali-saponified polymer film, wherein
    the washing step includes a plurality of water-washing steps of washing the alkaline solution coated on the polymer film away using washing water along the travel direction of the polymer film, and the used washing water is reused, wherein, of the plurality of water-washing steps, at least the most upstream water-washing step is kept at room temperature or higher.

7. The method for alkaline saponification of a polymer film according to claim 1, wherein, of the plurality of water-washing steps, at least the most upstream water-washing step is kept at room temperature or higher.

8. The method for alkaline saponification of a polymer film according to claim 2, wherein, of the plurality of water-washing steps, at least the most upstream water-washing step is kept at room temperature or higher.

9. The method for alkaline saponification of a polymer film according to claim 3, wherein, of the plurality of water-washing steps, at least the most upstream water-washing step is kept at room temperature or higher.

10. The method for alkaline saponification of a polymer film according to claim 1, further comprising a drying step after the washing step.

11. The method for alkaline saponification of a polymer film according to claim 2, further comprising a drying step after the washing step.

12. The method for alkaline saponification of a polymer film according to claim 3, further comprising a drying step after the washing step.

13. The method for alkaline saponification of a polymer film according to claim 6, further comprising a drying step after the washing step.

14. An apparatus for alkaline saponification of a polymer film, comprising:
    an alkaline saponification section in which the polymer film is subjected to with an alkaline solution; and
    a washing section in which the alkaline solution is washed away from the alkali-saponified polymer film in the alkaline saponification section, wherein
    the washing section includes: a plurality of sets of water-washing/draining units provided along the travel direction of the polymer film, and each includes a water-washing device which washes away the alkaline solution coated on the polymer film with washing water and a draining device which is provided subsequently after the water-washing device and removes the washing water present on the surface of the polymer film; and washing water recovering/feeding devices which are provided for the respective water-washing/draining units and each of which recovers the washing water used in a downstream water-washing/draining unit and feeds the recovered washing water to a water-washing/draining unit upstream of the downstream water-washing/draining unit.

15. The apparatus for alkaline saponification of a polymer film according to claim 14, wherein in the plurality of water-washing/draining units, at least the most upstream water-washing device is provided with a temperature controlling device.

* * * * *